(12) United States Patent
Christal

(10) Patent No.: US 6,421,545 B1
(45) Date of Patent: Jul. 16, 2002

(54) MOBILE TELEPHONE

(75) Inventor: Philip Christal, Anzing (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 08/358,354

(22) Filed: Dec. 19, 1994

(30) Foreign Application Priority Data

Dec. 17, 1993 (DE) .......................................... 43 43 295

(51) Int. Cl.[7] ................................................ H04B 7/20
(52) U.S. Cl. ........................ 455/566; 455/415; 455/466; 455/550
(58) Field of Search ....................... 379/58, 59; 455/90, 455/412, 413, 414, 415, 422, 458, 461, 466, 550, 556, 557, 566, 575

(56) References Cited

U.S. PATENT DOCUMENTS 5,177,780 A * 1/1993 Kasper et al. ................. 379/59
5,465,401 A * 11/1995 Thompson et al. ............ 379/58

FOREIGN PATENT DOCUMENTS

| EP | A-0494525 | 7/1992 |
| JP | A-01114220 | 5/1989 |

OTHER PUBLICATIONS

Fennell, J. Kim, Voice processing on the mobile network, Telecommunication, p 82–86, Feb. 1993.*

* cited by examiner

Primary Examiner—Nay Maung
(74) Attorney, Agent, or Firm—Bell, Boyd & Lloyd LLC

(57) ABSTRACT

A mobile telephone has a key field with selection keys and function keys, a display field, and transmission/reception equipment potentially integrated in a hand-held control part of the mobile telephone. A soft key referenced with the designation "message" in a stand by mode flashes upon reception of a message via short message service or caller line identification. A message menu is displayed when the soft key is pressed, this message menu containing messages about a voice message, a text message including the plurality of new or old messages and also offering the plurality of known callers, of unknown callers and a possibility of sending messages. Voice messages, short messages and caller line identification displays flash when new messages that have not yet been read have been received. A scroll system allows users to scroll to the desired message and press either a key "listen" or "view". A call to the voice message service is initiated by pressing the key "listen" and remaining access control is in agreement with the voice message service center by using voice or coded cryptocommands. The users are invited upon initial access to their voice message center to activate a predetermined key and input a required telephone number.

3 Claims, 1 Drawing Sheet

MOBILE TELEPHONE

BACKGROUND OF THE INVENTION

The present invention is directed to a mobile telephone having a key field with selection keys and function keys, having a display field, and having transmission/reception equipment potentially integrated in the control part (hand held).

New communication services are being introduced in the GSM (group special mobile), the new mobile radio telephone system, and some are being introduced from other mobile radio telephone systems. These services comprise voice and text messages and caller line identification (CLI). Many feature operations are hardly understood by the user resulting in low user acceptance and utilization. Potential human-machine interface problems with communication service result from whether a new message is waiting, whether a type is to be identified and whether it is to be made visually or audibly accessible.

Voice communication systems in analog networks were accessible to the user by routinely interrogating their voice message centers or by receiving a call from their voice message center (VMC) upon connection.

SUMMARY OF THE INVENTION

The present invention is based on the object of creating a simple solution for a message display for a mobile telephone of the type initially set forth.

Figure 1:
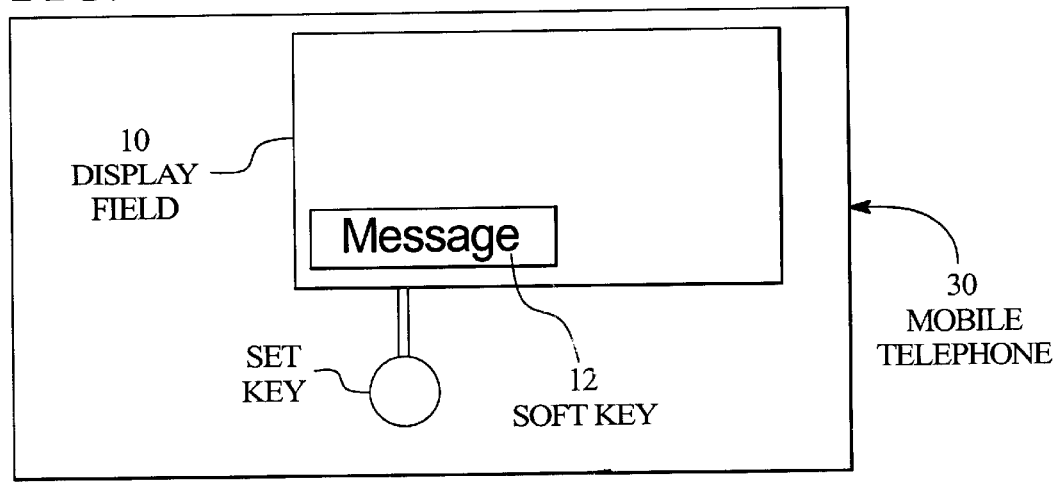
Figure 2:
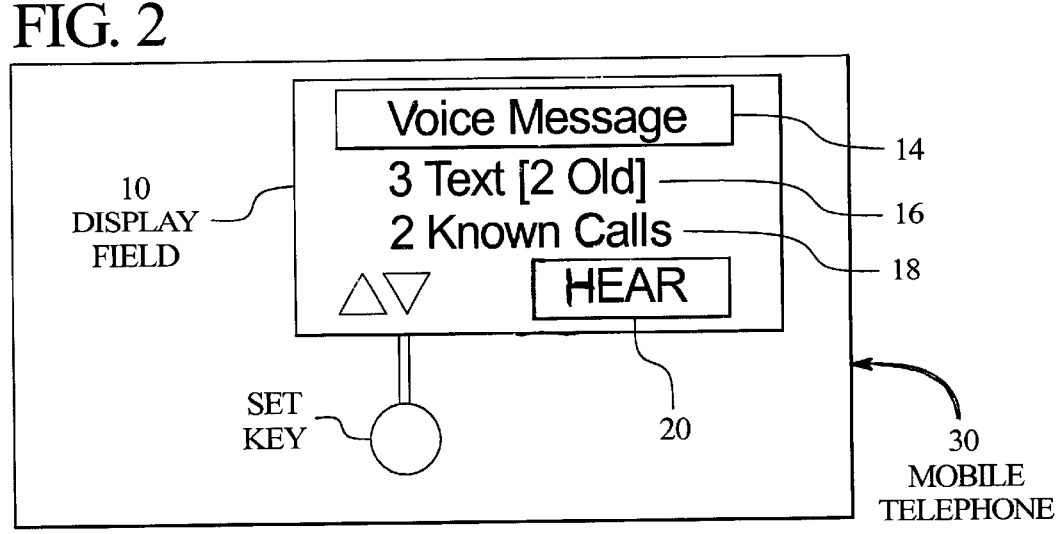
Figure 3:
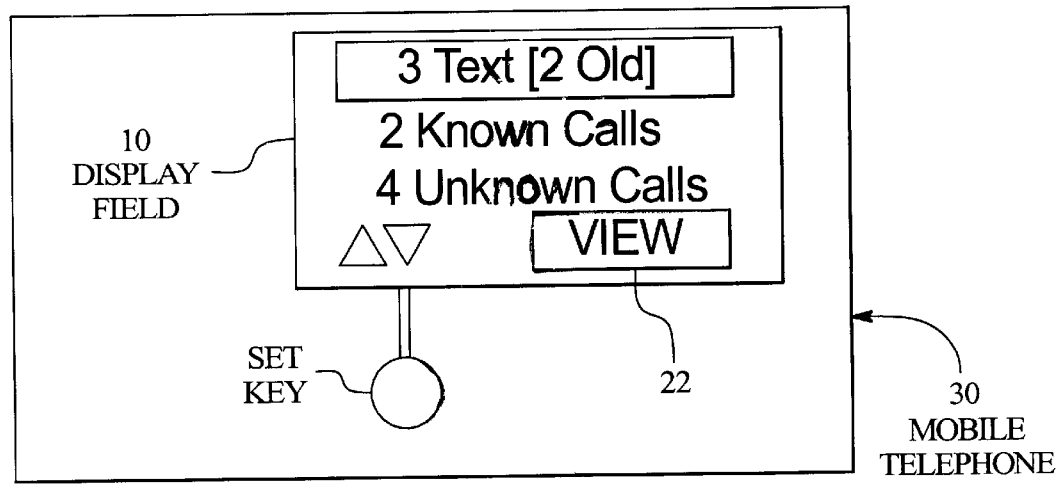

This object is inventively achieved by a key (soft key) referenced with the designation "message" in the stand by mode. The key flashes upon reception of a message via short message service (SMS) or call identification and is potentially coupled with an acoustic signal. When pressed, a message menu is displayed that contains messages about a voice message, a text message including the number of new or old messages as well as the message status is presented. Displays for voice message 14, short messages 16 (SMS) and caller line identification 18 (CLI) thereby flash when new messages that have not yet been read have been received. When the text message memory is full, the display likewise flashes. A user can scroll to the desired message and can press either a key (soft key) "listen" 20 or "see" 22 as needed (see FIGS. 2 and 3). By pressing the key "listen", a call is initiated to the voice message center (VMC); a remaining access control is thereby in agreement with the voice message center by using voice or coded cryptocommands.

Upon initial access to their voice message center, the users are invited to press a "set" key and to input the required telephone number (message center phone number). Renewed pressing thereafter effects a storing with an identifier on the SIM. The "message center phone number" must have been communicated to the user by his network operator as part of the registration of this service. It can likewise be provided that the number is pre-programmed on the SIM by the operator or handler.

The key designations (soft key legends) can be employed for marking the end of a message and for offering the existing possibilities of modifications (edit) and erasing (delete). Likewise, the flashing "delete" legend can be employed in order to indicate a full message memory.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A mobile telephone, comprising:
    a display and associated soft keys;
    a soft key referenced with a designation "message" in a stand by mode of the mobile telephone, the designation "message" flashing upon reception of a message via short message service or caller line identification;
    a message menu that is displayed when said soft key is pressed, said message menu containing messages in regards to a voice message, a text message including a plurality of new or old messages and a plurality of at least one of known callers and unknown callers;
    a scroll system such that a user scrolls to a desired message and presses either a soft key "listen" or a soft key "view";
    a call to a voice message service being initiated by pressing the soft key "listen", remaining access control being in agreement with a voice message service center by using voice or coded cryptocommands, upon initial access to the voice message center, the user activating a predetermined key and inputting a required telephone number, soft key legends being used for marking an end of a message and for offering existing possibilities of modifying and erasing messages.

2. The mobile telephone according to claim 1, wherein the mobile telephone has displays for voice messages, short messages and caller line identification, said displays flashing when new messages that have not yet been read have been received by the mobile telephone.

3. The mobile telephone according to claim 1, wherein a flashing "delete" legend is used for indicating a full message memory.

* * * * *